(12) United States Patent
Nelson et al.

(10) Patent No.: US 6,424,119 B1
(45) Date of Patent: Jul. 23, 2002

(54) MULTIPLE ENERGY STORAGE DEVICE CONTROLLER

(75) Inventors: James E. Nelson, Salem, NH (US); C. Michael Hoff, Boxborough, MA (US); Daniel C. Cohen, Newton, MA (US); Philip C. Hopkins, Ashby, MA (US)

(73) Assignee: American Power Conversion, West Kingston, RI (US)

( * ) Notice: Subject to any disclaimer, the term of this patent is extended or adjusted under 35 U.S.C. 154(b) by 0 days.

(21) Appl. No.: 09/838,757

(22) Filed: Apr. 19, 2001

(51) Int. Cl.⁷ .............................................. H01M 10/46
(52) U.S. Cl. ....................................................... 320/116
(58) Field of Search ................................ 320/116, 118, 320/119, 121, 122, 127, 128, 135, 137

(56) References Cited

U.S. PATENT DOCUMENTS

| | | | |
|---|---|---|---|
| 4,673,826 A | 6/1987 | Masson ........................ 307/66 |
| 4,709,202 A | 11/1987 | Koenck et al. ................ 320/43 |
| 5,272,382 A | 12/1993 | Heald et al. ................... 307/66 |
| 5,319,571 A | 6/1994 | Langer et al. ............... 364/492 |
| 5,422,558 A | 6/1995 | Stewart ........................... 320/7 |
| 5,504,415 A | 4/1996 | Podrazhansky et al. ....... 320/18 |
| 5,510,690 A | 4/1996 | Tanaka et al. | |
| 5,563,493 A | 10/1996 | Matsuda et al ................. 320/6 |
| 5,798,633 A | * | 8/1998 | Larsen et al. |
| 6,150,795 A | * | 11/2000 | Kutkut et al. |
| 6,274,950 B1 | 8/2001 | Gottlieb et al. ............... 307/66 |

OTHER PUBLICATIONS

American Power Conversion, Corp., Symmetra power array scalable, redundant power protection for multiple servers and business–critical applications, (12 pgs.). no date.

American Power Conversion, Corp., Matrix–UPS, advanced, modular power management for datacenters and mission–critical servers, (7 pgs.), no date.

American Power Conversion, Corp., Smart–UPS XL, expandable, extended–run protection for maximum uptime applications, (13 pgs.), no date.

* cited by examiner

Primary Examiner—Edward H. Tso
(74) Attorney, Agent, or Firm—Mintz, Levin, Cohn, Ferris, Glovsky and Popeo, P.C.

(57) ABSTRACT

A system for controlling multiple energy storage devices in an uninterruptible power supply (UPS) system is provided. In one embodiment of the invention, the system generally includes a charger coupled to a direct current (DC) bus of the UPS system, and two or more energy storage circuits, each of which includes a power regulator coupled to the charger and coupled to the DC bus, at least one energy storage device coupled to the power regulator, and a processor coupled to the power regulator for controlling the charge and discharge of the at least one energy storage device. In another embodiment of the invention, digital communication between two or more controllers is accomplished over the DC bus through use of the Control Area Network (CAN) protocol.

41 Claims, 9 Drawing Sheets

| | | | | | |
|---|---|---|---|---|---|
| 1 Mbit/s 25 m | 1 μs | 8 | 125 ns | 6 $t_q$ (750 ns) | 0 |
| 800 kbit/s 50 m | 1.25 μs | 10 | 125 ns | 8 $t_q$ (1 μs) | 1 |
| 500 kbit/s 100 m | 2 μs | 16 | 125 ns | 14 $t_q$ (1.75 μs) | 2 |
| 250 kbit/s (2) 250 m | 4 μs | 16 | 250 ns | 14 $t_q$ (3.5 μs) | 3 |
| 125 kbit/s (2) 500 m | 8 μs | 16 | 500 ns | 14 $t_q$ (7 μs) | 4 |
| 50 kbit/s (3) 1000 m | 20 μs | 16 | 1.25 μs | 14 $t_q$ (17.5 μs) | 5 |
| 20 kbit/s (3) 2500 m | 50 μs | 16 | 3.125 μs | 14 $t_q$ (43.75 μs) | 6 |
| 10 kbit/s (3) 5000 m | 100 μs | 16 | 6.25 μs | 14 $t_q$ (87.5 μs) | 7 |

MULTIPLE ENERGY STORAGE DEVICE CONTROLLER

FIELD OF THE INVENTION

The present application relates generally to an apparatus for charging one or more batteries. More specifically, it relates to an apparatus for charging one or more batteries in an uninterruptible power supply system.

BACKGROUND OF THE INVENTION

Figure 1:
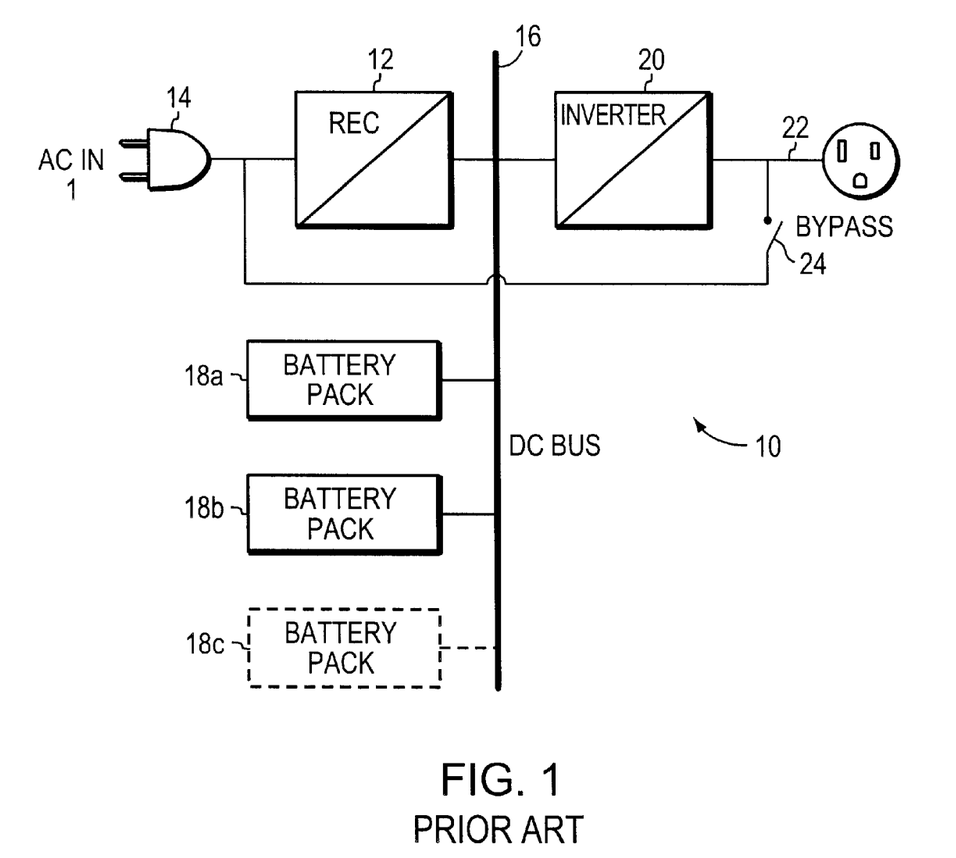
FIG. 1 is a prior art circuit diagram of a typical uninterruptible power supply system.

Generally, uninterruptible power supply (UPS) systems and DC storage plants are set up with batteries directly connected to a bus only through fuses, switches, relays, or shunts. For example, FIG. 1 shows a typical prior art uninterruptible power supply UPS system 10. A charger 12 or rectifier is coupled between an input 14 having alternating current and a DC bus 16 and converts the alternating current to a direct current. Multiple battery packs 18a–18c are connected to the DC bus 16 and are thus charged by the charger 12. The DC bus 16 is connected to an inverter 20, which is connected to the UPS output 22. A system bypass 24 can also be included for bypassing the UPS system in the event of a UPS malfunction. In the event of a power failure from input 14, the batteries 18a–18c will supply power to the UPS output 22 through the inverter 20.

Figure 2:
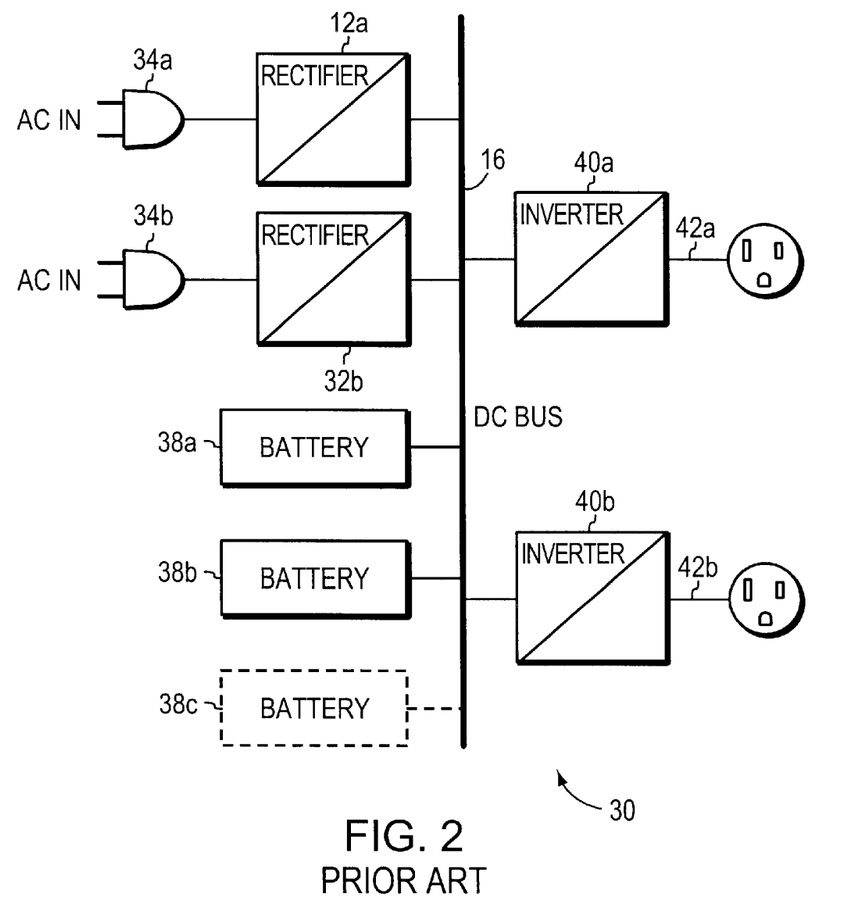
FIG. 2 is a prior art circuit diagram of an uninterruptible power supply used with a typical DC storage plant.

FIG. 2 shows a typical prior art UPS system in a DC storage plant. One or more rectifiers 32a, 32b are respectively coupled between inputs 34a, 34b each having an alternating current signal thereon and a DC bus 36 and convert each alternating current signal to a direct current. Multiple battery packs 38a14 38c are connected to the DC bus 36 and are thus charged by the rectifier 32. The DC bus 36 is connected to one or more inverters 40a, 40b, which are respectively connected to the UPS outputs 42a, 42b. Like the UPS system of FIG. 1, in the event of a power failure from input 34a and/or 34b, the batteries 38a–38c will supply power to the outputs 42a, 42b.

In both FIGS. 1 and 2, there is no control over the flow of energy in and out of the batteries because they are connected directly to the DC bus. In these systems, if a discharged battery is connected to the bus, the other batteries will deliver energy to the discharged battery until its charge is the same as all the rest, assuming that the voltage versus charge characteristics of all batteries are the same. Moreover, the systems in both FIGS. 1 and 2 do not allow for individualized dynamic charge control of each energy storage device so that dissimilar energy storage devices, such as batteries of different chemistry, and storage devices of similar type but differing condition, such as batteries in different temperature zones or of differing ages, cannot effectively be connected to the same bus.

SUMMARY OF THE INVENTION

Embodiments of the present invention use a power regulator, such as a DC. to DC converter, connected between one or more energy storage devices and a DC bus to control the energy flow of each of the energy storage devices in a desired manner. In one embodiment of the invention, the system for controlling multiple energy storage devices in an uninterruptible power supply (UPS) system includes a charger coupled to a direct current (DC) bus of the UPS system, and two or more energy storage circuits each of which include a power regulator coupled to the charger and coupled to the DC bus, at least one energy storage device coupled to the power regulator; and a processor coupled to the converter for controlling the charge and discharge of the at least one energy storage device.

In another embodiment of the invention, a digital communication link such as that employing the Control Area Network (CAN) protocol is used to digitally communicate between two or more processors. Communication using the CAN protocol can be accomplished over the DC bus or can be accomplished over an additional copper, fibre-optic or wireless communication link.

In yet another embodiment of the invention, the energy capacity of the system is determined though a voltage measurement of the DC bus which is set by the one or more energy storage devices to be equal to a value representing the collective energy stored/remaining according to a predetermined voltage to capacity relationship.

One advantage of embodiments of the invention is that the energy storage devices will regulate their discharge and recharge rates according to predetermined system requirements and their own capability.

Another advantage of embodiments of the invention is that the energy capacity of the system can be determined by simply measuring the voltage on the DC bus. By measuring the voltage of the DC bus, an inverter, which typically has no information as to how many battery packs are coupled to it, can easily tell how much run-time it has without digital communication to a master controller. Devices that draw energy from the bus, such as load equipment, can obtain information about the remaining run-time. This information is particularly beneficial when the master controller is unavailable or not installed or when digital communication is unavailable.

Yet another advantage of embodiments of the invention is that the energy delivery system can be designed with the more versatile digital communication system and have a reliable backup communication system in case the digital communication is unavailable merely by measuring the voltage on the DC bus.

DETAILED DESCRIPTION OF THE INVENTION

Figure 3:
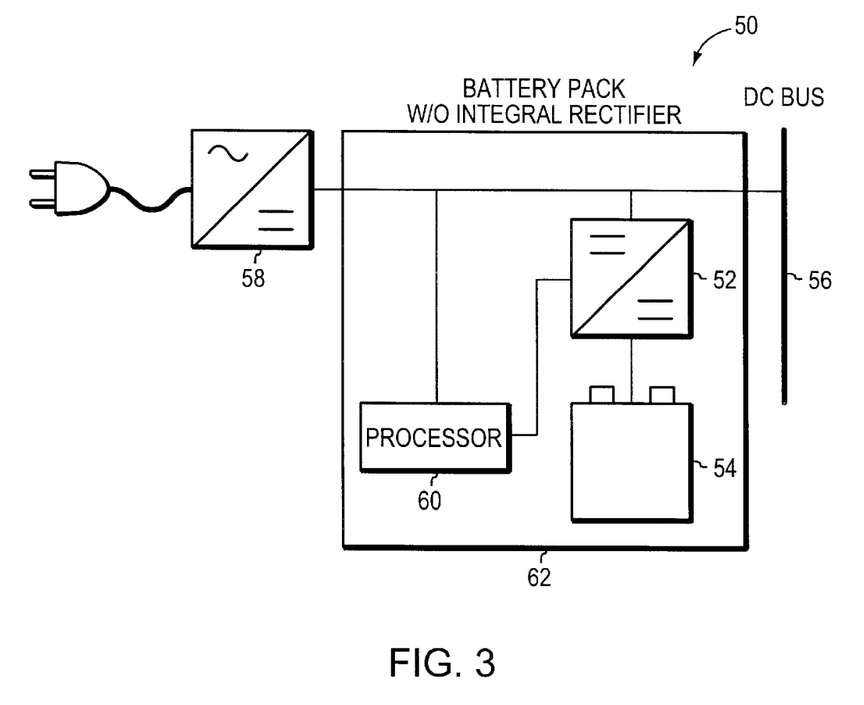
FIG. 3 is a circuit diagram of one embodiment of a multiple energy storage device controller in accordance with the invention.

FIG. 3 shows one embodiment of the battery charger 50 in which a power regulator 52 is connected between an energy storage device 54 and a DC bus 56 to control the energy flow therebetween. A processor 60, such as a microprocessor, is connected to each power regulator 52 to control its operation and/or monitor one or more of its functions. The processor 60 can be coupled to the DC bus 56 to monitor the bus and/or communicate with one or more other processors. The circuitry for the multiple battery charger 50 can, but not necessarily, be manufactured on a different module 62 for each different energy storage device 54. With the present invention, energy storage devices of different chemistries and condition can be connected to the bus and be independently managed for optimal performance and service-life. The state of charge of each energy storage device can be managed separately to follow predetermined rules such as rules based upon cost of use.

The present invention allows use of different energy storage device types that can store and deliver energy, such as, for example, batteries, solar power systems or internal combustion engines. Also, the batteries can be of different chemical types. The processor 60 preferably conducts an energy analysis of the corresponding energy storage device. The energy analysis of the processor 60 can include the state of charge, the state of condition and capacity of the energy storage device.

Figure 4:
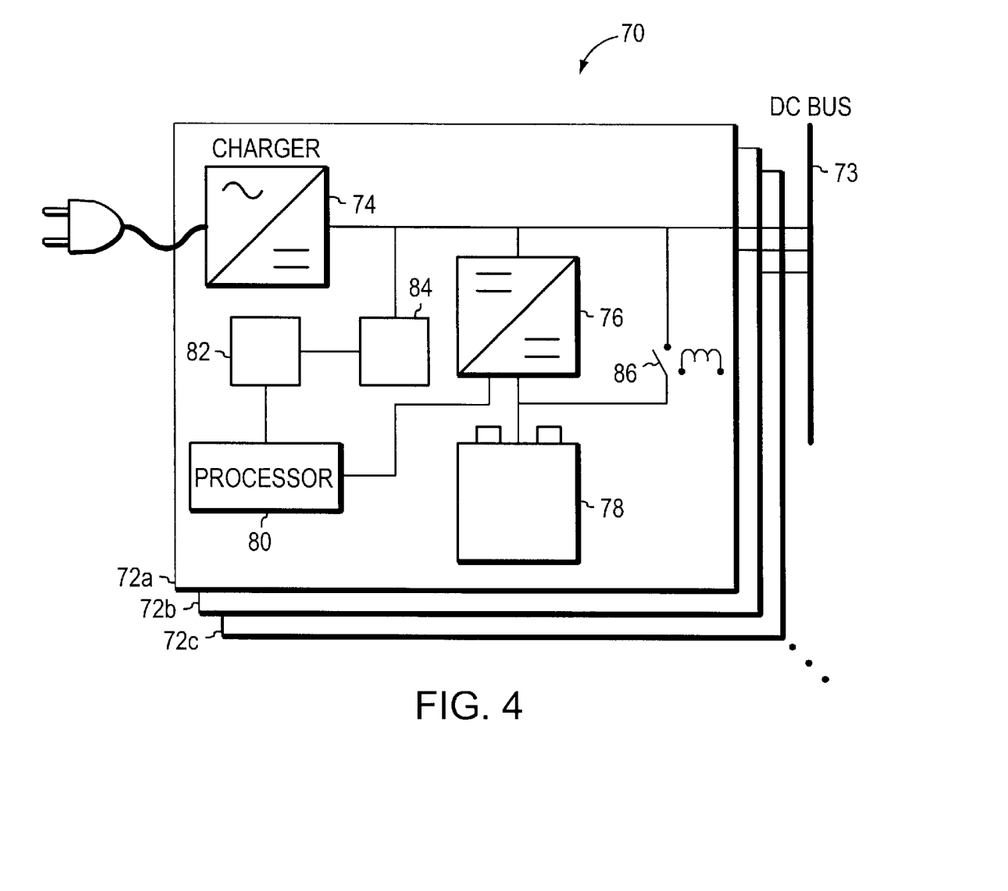
FIG. 4 is a circuit diagram of another embodiment of a multiple energy storage device controller in which more than one module is coupled to the DC bus.

FIG. 4 shows another embodiment of the multiple battery charger 70 in which two or more energy storage circuits, each of which can be place on a separate module 72a, 72b, 72c, are coupled to the DC bus 73. Preferably, each module can have a charger 74 for converting an alternating or other type of current into a direct current, such as a pulsating direct current, that can be used for charging one or more energy storage devices. Alternatively, one charger 74 can be used to provide charging current to all modules. A power regulator 76, such as a DC/DC converter, is coupled between both the charger 74 and the DC bus 73 and an energy storage device 78. The power regulator 76 controls the power flow to and from the each module's energy storage device 78, such as a battery, and the charger 74 or the DC bus 73. Each energy storage circuit has a processor 80, such as a microprocessor, that is coupled to the power regulator on the same module and controls the function of the power regulator. The processor 80 is preferably connected to a controller 82, such as a CAN controller, for adapting the communication protocol used by the processor to be communicated to the other processors. The CAN controller can communicate over other mediums such as twisted pair wiring, fiber-optic or wireless links. The processor 80 may perform the same functions as the processor 60 of FIG. 3. The energy storage circuit can also include an RF transceiver 84 for transmitting and receiving the communication signals over the DC bus 73. A relay or switch 86, such as a fail-over relay, is coupled in parallel with the power regulator to bypass the power regulator 76 in case a malfunction occurs with it or the processor 80 if raw power from the energy storage devices is approximately compatible with the power input requirements of devices coupled to the bus which draws power. If this is not the case, then the relay is not implemented.

To regulate power flow to and from each storage device, either digital or analog communications can be used. In one embodiment of the invention, digital is the primary communications method and the analog method is a back-up method in case the digital communication fails. Communication between the modules can be used, for example, to ensure that one module does not discharge into another module that is charging at the same time a power outage exists. Suboptimal behavior such as this could lead to inefficient operation and reduced performance levels of the system.

Digital communication is the preferable communication medium between two or more modules. Digital communication is preferably accomplished by modulating digital information on the DC bus, to which each of the modules are connected. The processor of each module can share information about loading, charge levels, availability and cost per use. A master processor preferably collects all this data and coordinates the energy flow to and from each device to maintain load availability, use the cheapest alternative energy source, manage optimum energy reserves, and/or prolong service life time of energy storage devices. The master processor can set the discharge rate or recharge rate of each of the connected modules by sending parameters to the local module processor. Each local processor can dynamically control its power regulator to conform to the rules transmitted by the master processor.

Alternatively, analog communication can be used, such as in the absence of a master processor, during a digital communication failure, or when digital communication is "slow." For example, the DC bus voltage can be controlled to be a value that corresponds to a system capacity such that the capacity can be determined through an analog measurement. The DC bus voltage can be controlled independently of the energy storage devices and power can be regulated to and from the energy storage devices on to the bus.

In one embodiment during charging and discharging of the energy storage devices, each of the energy storage devices charges or discharges to make its own energy value equal to the system capacity energy value. For example, if the system were charging on line, its capacity value was 80% and a new battery with 60% capacity was connected, the new battery would charge by itself or would charge faster than the others to bring the new battery up to the same capacity as the others, then the others would continue charging as usual. If the system were discharging, the 80% batteries would discharge down to the 60% level of the new battery and then the new one will join in with others to discharge equally.

Figure 5:
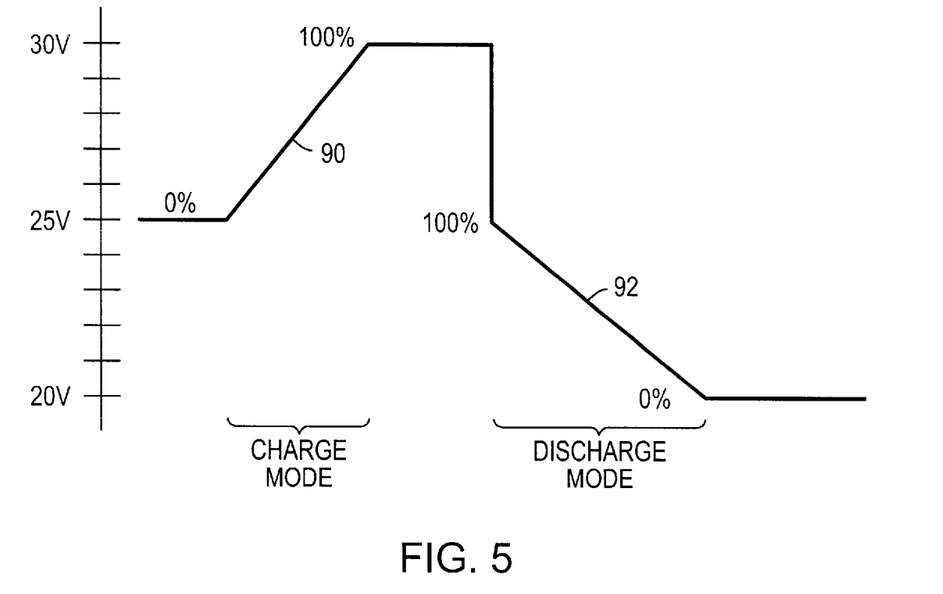
FIG. 5 is an exemplary graph of voltage versus time for an embodiment of the invention in which separate equations are used for the discharge and charge modes.

In another embodiment, the voltage of the DC bus can be controlled to indicate a state of charge of the one or more energy devices. To accomplish this, a separate equation is used for the discharge and charge modes such that the energy or voltage range is different for the charge and discharge modes. For example, with reference to FIG. 5, when a UPS is charging the DC voltage would vary from 25V to 30V as shown at 90 when the capacity moves from 0% to 100%. Thus, if the measured voltage on the DC bus is 29 Volts, then the voltage will indicate that the UPS is charging the energy storage devices and their average capacity is 80%. When the UPS energy devices are discharging, the bus would vary from 25 to 20V as the capacity moves from 100% to 0% as shown at 92. Thus, if the measured voltage on the DC bus is 21 Volts, then the voltage will indicate that the energy storage devices are discharging and their average capacity is 20%. In this embodiment, it would appear as if the DC bus voltage has hysteresis.

In another embodiment during charging and discharging of the energy storage devices, a +/−0.5V "dead zone" would be added around the 25V point separating the charge mode range from the discharge mode range. In this case, the charge mode would occupy the 25.5V to 30V region and the discharge mode would occupy the 24.5V to 20V region. The purpose of this dead zone is to insure that when measuring the voltage on the DC bus, an ambiguous state does not occur at or near the center voltage and also to remove uncertainty due to minor voltage drops across system wiring.

In yet another embodiment, the system can allow for a voltage level on the DC bus to be greater than the 100% capacity level to indicate "free" or preferred energy available on the bus. For example, the voltage level would be 30.5V or greater in either of the two preceding examples. Some examples of this energy would be solar cells, generated power, or alternative power sources. When the DC bus voltage is in the greater than capacity state, an inverter is possibly taking energy from the DC bus rather than using its primary source. This voltage movement and hysteresis happens naturally in a battery as the state changes from discharge to charge, so the concept is not foreign to a simple connection. In each of the embodiments of charging and discharging the energy storage devices described herein, code can be embedded in the one or more processors to accomplish the desired method.

Figure 6:
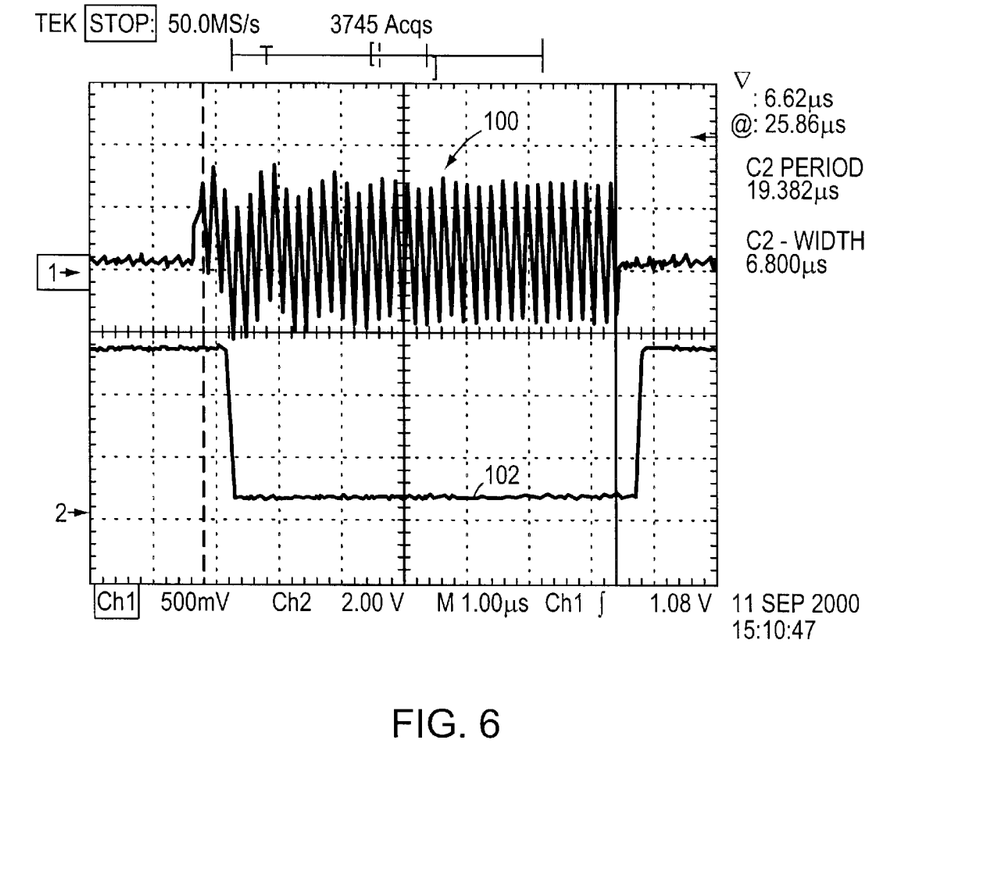
FIG. 6 exemplary graph of voltage versus time that shows a sample of a modulated RF burst on a 120VAC power line and the corresponding decoded data bit.

In one embodiment of the invention, digital communication between two or more processors is accomplished using the Control Area Network (CAN) protocol. The CAN protocol defines a method of communication among many devices on a multi-drop single wire bus. In this embodiment, data sent across the bus is first converted to CAN format by a CAN processor 82 as shown in FIG. 4. The CAN format adds header and footer information to the data packet to define items including, but not limited to, sender information, message priority, and/or error correction/ detection information. After the data packet format is converted to CAN, an RF transceiver 84 converts the digital packet into an RF stream and modulates it on an DC or AC power line. FIG. 6 shows a sample of a modulated RF burst 100 on a 120VAC power line and the ensuing decoded data bit 102.

The network architecture of the CAN protocol makes possible a multi-component UPS system that is expandable, hot pluggable, and has simple wiring. The CAN protocol is appropriate for simple messaging. CAN hardware is inexpensive and implements much of the bottom architecture layers in hardware, including error correction, bus arbitration and packet filtering. Some of the desirable features of CAN hardware include: prioritization of messages, configuration flexibility, system wide data consistency, multimaster, error detection and error signaling, automatic retransmission of corrupted messages as soon as the bus is idle again, distinction between temporary error and permanent failures of nodes and autonomous switching off of defect nodes.

Figure 7:
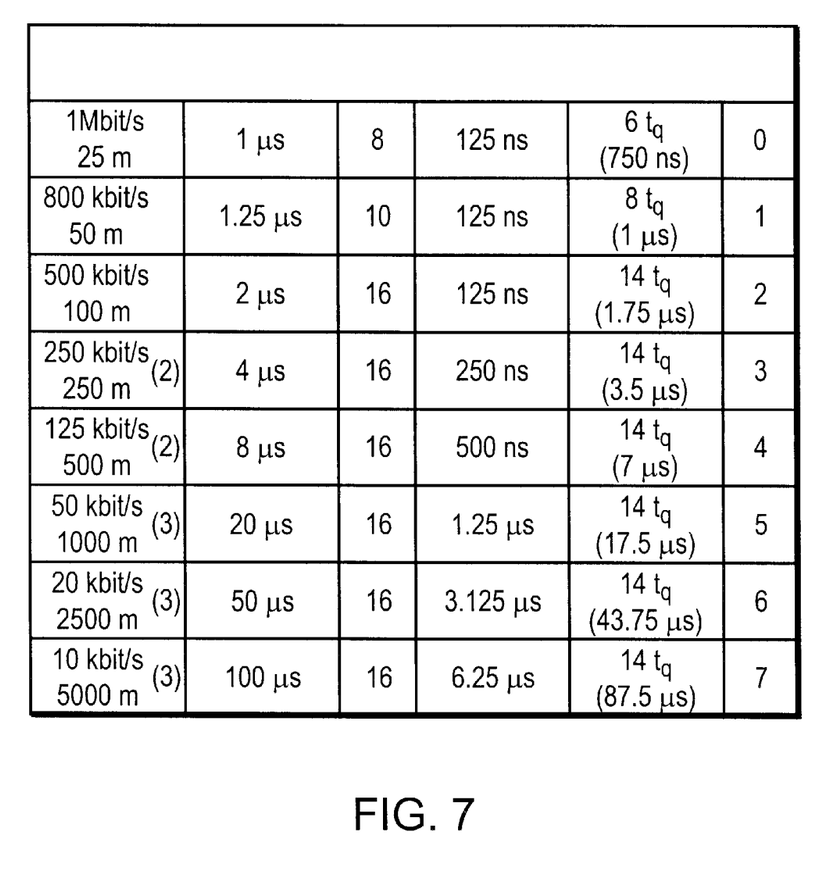
FIG. 7 is a chart that shows some of the data rates supported by the CAN communication protocol.
Figure 8:
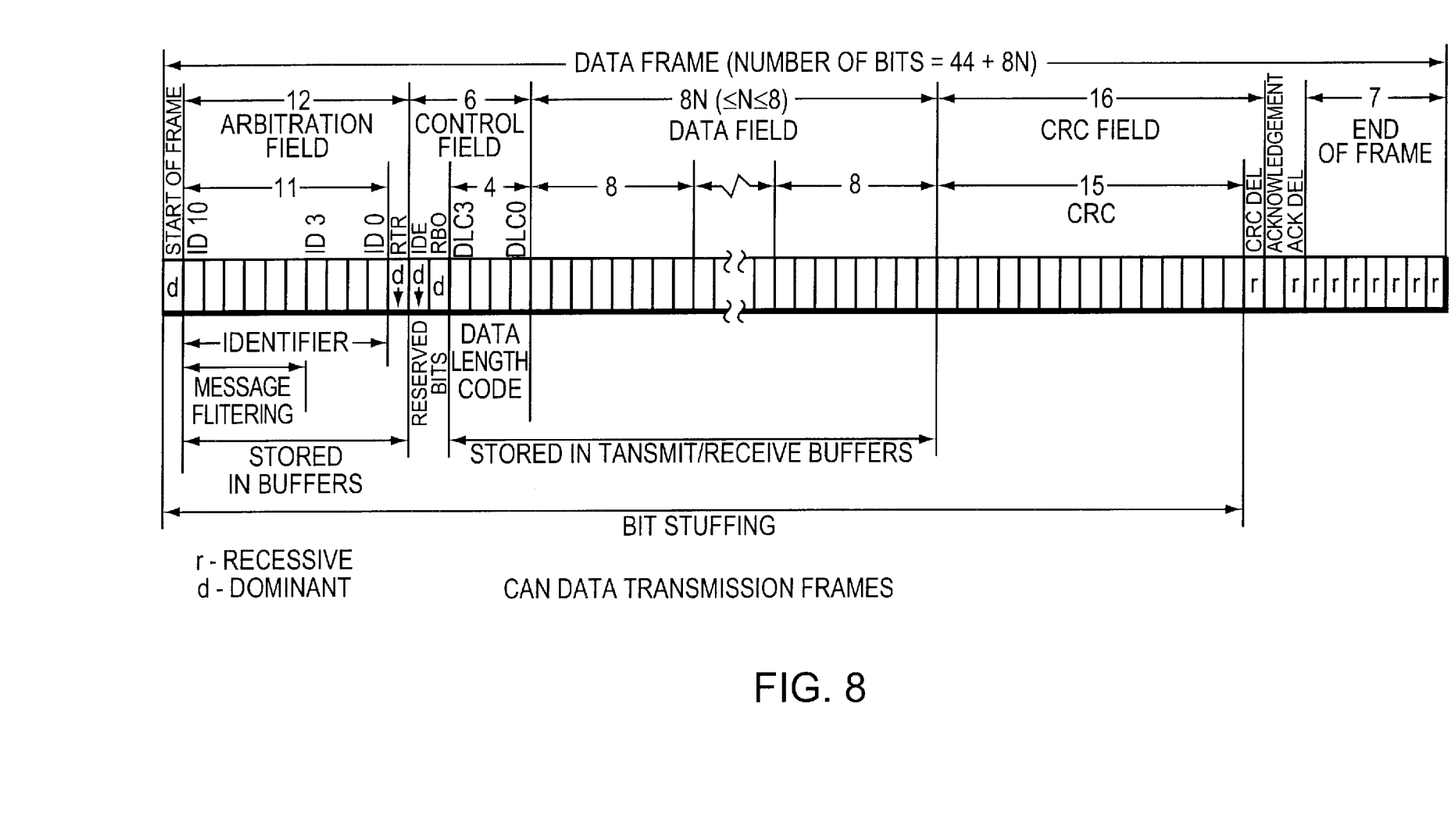
FIG. 8 is a diagram of a CAN data packet.

FIG. 7 shows the variety of data rates that CAN supports at or above 10 kbit/s. These data rates are typically higher than those of some communication architectures that have been developed for use over power lines. The CAN protocol is intended for light messaging loads, thus the overhead to the system is low. FIG. 8 shows a diagram of a typical CAN data packet.

While transmitting, the transceiver "listens" to or monitors the power line to make sure that while it is sending a recessive bit 110 (no RF) another module is not sending a dominant bit 112 (RF on). If another module is sending a dominant bit, the transmission is stopped and the other sender is allowed to continue transmission.

The CAN bus arbitration scheme is a bit-by-bit nondestructive method to allow multiple devices to begin transmitting when they want, but to stop transmission when a device discover another device transmitting. There is no need for a re-transmission when a collision has been detected. The transmitting device with the winning priority continues transmitting without having to start over again, because the dominant bit that collided "won" over the recessive bit of the lower priority message.

Figure 9:
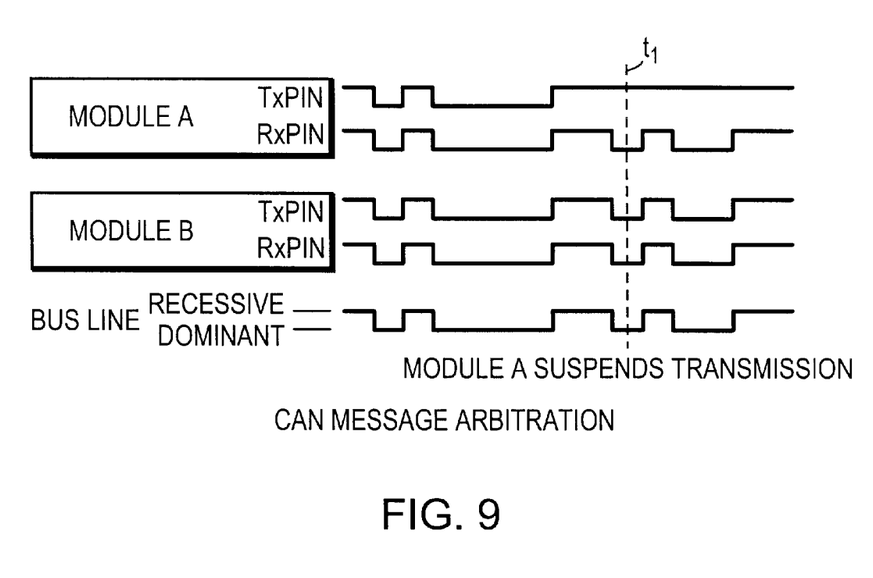
FIG. 9 is an exemplary timing diagram that illustrates the message arbitration scheme implemented in CAN.

FIG. 9 shows an example of the message arbitration scheme implemented in CAN. CAN hardware uses bitwise message arbitration, a nondestructive method to resolve collisions. In FIG. 9, the symbol TxPIN refers to a signal transmitted by a module a signal received from another module. At time $t_1$ module A suspends transmission of its signal at TxPIN because it received a dominant low signal from Module B. Unlike other systems, CAN does not require a re-transmission of data by the dominant node in the case of a collision. Either a specially designed proprietary software protocol or the free CAN open software protocol can be used. The CAN open software protocol is available at the website http://www.can-cia.org.

The signal level at the DC bus is generally at the output level of inverters or on battery lines, thus an RF signal modulated on the DC bus can be of a higher frequency while maintaining appropriate regulatory certification. Having a higher RF frequency allows a higher data rate because of the increased bandwidth available. Thus, the use of existing CAN hardware and an RF transceiver, which can be implemented through the use of an Application Specific Integrated Circuit (ASIC), can provide high data integrity and high data transmission rates.

In another embodiment of the invention, the energy storage devices can be Lion and/or NiMH batteries, the subject matter of which is disclosed in the copending application entitled "Uninterruptible Power Supply System Having an NiMH or Lion battery," filed on May 19, 2001 which has a common assignee with the present application and which is herein incorporated by reference. An advantage to using both Lion and NiMH batteries is that they complement each other in that an NiMH battery is well suited for short discharge applications and a Lion battery is well suited for long discharge applications.

It should be understood that the foregoing is illustrative and not limiting and that obvious modifications may be made by those skilled in the art without departing from the spirit of the invention. Accordingly, reference should be made primarily to the accompanying claims, rather than the foregoing specification, to determine the scope of the invention.

What is claimed is:

1. A system for controlling multiple energy storage devices in an uninterruptible power supply (UPS) system, the system comprising:
 a charger coupled to a direct current (DC) bus of the UPS system;
 two or more energy storage circuits each comprising:
  a power regulator coupled to the charger and coupled to the DC bus;
  at least one energy storage device coupled to the power regulator; and
  a processor coupled to the power regulator for controlling the charge and discharge of the at least one energy storage device.

2. The system of claim 1, wherein each energy storage circuit includes a charger.

3. The system of claim 1, wherein each energy storage circuit further includes a relay coupled in parallel with the converter for bypassing current around the converter.

4. The system of claim 1, wherein each processor digitally communicates with the other processors.

5. The system of claim 4, wherein each processor digitally communicates with the other processors over the DC bus.

6. The system of claim 1, wherein each energy storage circuit further comprises a controller coupled between each processor and the data bus, each controller communicating data to and from the processor coupled thereto and adapting the data to be communicated over the DC bus.

7. The system of claim 6, further comprising an RF transceiver coupled between the controller and the DC bus for receiving and transmitting a modulated RF signal on the DC bus.

8. The system of claim 6, wherein each controller digitally communicates using a control area network protocol.

9. The system of claim 1, further comprising a master processor coupled to the processor on each of the energy storage circuits for controlling each of the processors.

10. The system of claim 1, wherein the master processor digitally communicates with the other processors using a control area network protocol.

11. The system of claim 1, wherein for each energy storage circuit the processor has code embedded therein for carrying out the step of charging or discharging the at least one energy storage device of the energy storage circuit for causing a voltage level of the energy storage device to be equal to a voltage level of the DC bus.

12. The system of claim 1, wherein the processor has code embedded therein for causing the voltage on the DC bus to be indicative of an average state of charge of each of the energy storage devices.

13. The system of claim 12, wherein a first voltage range of the DC bus indicates that one or more of the energy storage devices is being charged and a second voltage range of the DC bus indicates that one or more of the energy storage devices is being discharged.

14. The system of claim 13, wherein the DC bus has a third voltage range being between the first and the second voltage ranges which indicates that each energy storage device is neither being charged nor discharged.

15. The system of claim 13, wherein the DC bus has a fourth voltage range being above the first and the second voltage ranges which indicates that the at least one energy storage devices are at a greater than capacity level.

16. The system of claim 15, further comprising the UPS system.

17. A system for controlling multiple energy storage devices in an uninterruptible power supply (UPS) system, the system comprising:
a charger coupled to a direct current (DC) bus of the UPS system;
a master processor; and
two or more energy storage circuits each comprising:
a DC to DC converter coupled to the charger and coupled to the DC bus;
at least one energy storage device coupled to the converter;
a processor coupled to the DC to DC converter that controls the charge and discharge of the at least one energy storage device; and
a controller coupled between the processor and the DC bus, the controller for communicating data to and from the process and communicates the date over the DC bus;
wherein the master processor is coupled to the processor on each of the energy storage circuits for controlling each of the processors.

18. The system of claim 17, further comprising one or more chargers, wherein each energy storage circuit includes a charger.

19. The system of claim 17, wherein each energy storage circuit further includes a relay coupled in parallel with the converter for bypassing current around the converter.

20. The system of claim 17, wherein each processor digitally communicates with the other processors using a control area network protocol.

21. The system of claim 17, further comprising an RF transceiver coupled between the controller and the DC bus for receiving and transmitting a modulated RF signal on the DC bus.

22. The system of claim 17, wherein for each energy storage circuit, the processor has code embedded therein for carrying out the method of charging or discharging the energy storage device of the energy storage circuit for causing a voltage level of the energy storage device equal to a voltage level of the DC bus.

23. The system of claim 17, wherein the processor has code embedded therein for causing the voltage on the DC bus to be indicative of an average state of charge of each of the energy storage devices.

24. The system of claim 23, wherein a first voltage range of the DC bus indicates that one or more of the energy storage devices is being charged and a second voltage range of the DC bus indicates that one or more of the energy storage devices is being discharged.

25. The system of claim 23, wherein the DC bus has a third voltage range being between the first and the second voltage ranges which indicates that each energy storage device is neither being charged nor discharged.

26. The system of claim 23, wherein the DC bus has a fourth voltage range being above the first and the second voltage ranges which indicates that the at least one energy storage devices are at a greater than capacity level.

27. The system of claim 17, further comprising the UPS system.

28. A method for controlling multiple energy devices in an uninterruptible power supply (UPS) system having an internal DC bus, the method comprising:
controlling a flow of energy from the DC bus to at least one of the energy devices to charge the at least one of the energy devices; and
controlling a flow of energy from the at least one of the energy devices to the DC bus to provide power from the energy device to the DC bus during a battery mode of operation of the UPS.

29. The method of claim 28, further comprising providing a regulator between the DC bus and the at least one of the energy devices.

30. The method of claim 29, further comprising bypassing current around the regulator if the power regulator malfunctions.

31. The method of claim 28, further comprising:
controlling a flow of energy from the DC bus to a second of the energy devices to charge the second of the energy devices; and
controlling a flow of energy from the second of the energy devices to the DC bus to provide power from the energy device to the DC bus during a battery mode of operation of the UPS.

32. The method of claim 31, wherein the controlling of the at least one energy device and the second energy device is done by using a first processor and a second processor, respectively.

33. The method of claim 28, further comprising communicating between the first processor and the second processor over the DC bus.

34. The method of claim 28, further comprising using RF signals to communicate over the DC bus between the first processor and the second processor.

35. The method of claim 28, the method further comprising charging and discharging the energy storage device of the energy storage circuit for causing a voltage level of the energy storage device equal to a voltage level of the DC bus.

36. The method of claim 28, the method further comprising controlling the DC bus to have a first voltage range which indicates that one or more of the energy storage devices is being charged and a second voltage range of the DC bus which indicates that one or more of the energy storage devices is being discharged.

37. The method of claim 36, the method further comprising controlling the DC bus to have a third voltage range being between the first and the second voltage ranges which indicates that each energy storage device is neither being charged nor discharged.

38. The method of claim 36, the method further comprising controlling the DC bus to have a fourth voltage range being above the first and the second voltage ranges which indicates that the at least one energy storage devices are at a greater than capacity level.

39. A system for controlling multiple energy storage devices in an uninterruptible power supply (UPS) system, the system comprising:
 a charger coupled to a direct current (DC) bus of the UPS system;
 two or more energy storage circuits each comprising:
  a power regulator coupled to the charger and coupled to the DC bus;
  at least one energy storage device coupled to the power regulator; and
  means for controlling a charge and a discharge of at least one energy storage device.

40. The system of claim 39, wherein each of the means for controlling the charge and the discharge of the at least one energy storage device communicate with each other.

41. The system of claim 39, further comprising means for communicating over the DC bus.

* * * * *